United States Patent [19]
Mailänder

[11] Patent Number: 6,158,219
[45] Date of Patent: Dec. 12, 2000

[54] METHOD FOR TURBOCHARGING AN INTERNAL COMBUSTION ENGINE

[75] Inventor: Udo Mailänder, Bietigheim-Bissingen, Germany

[73] Assignee: Udo Mailänder GmbH, Germany

[21] Appl. No.: 09/317,649

[22] Filed: May 24, 1999

[30] Foreign Application Priority Data

May 22, 1998 [DE] Germany .......................... 198 23 014

[51] Int. Cl.[7] .................................................. F02B 33/44
[52] U.S. Cl. ............................................... 60/612; 60/606
[58] Field of Search .............................. 60/612, 602, 599, 60/606

[56] References Cited

U.S. PATENT DOCUMENTS

| | | | |
|---|---|---|---|
| 4,228,655 | 10/1980 | Hershcmann et al. | 60/602 |
| 4,299,090 | 11/1981 | Deutschmann | 60/612 |
| 4,422,296 | 12/1983 | Dinger et al. | 60/606 |
| 4,428,192 | 1/1984 | Dinger et al. | 60/606 |
| 4,488,827 | 12/1984 | Helmich et al. | 60/612 |
| 4,638,634 | 1/1987 | McLean | 60/612 |
| 5,109,674 | 5/1992 | Sudmanns | 60/612 |
| 5,199,261 | 4/1993 | Baker | 60/612 |
| 5,845,495 | 12/1998 | Schray et al. | 60/612 |

FOREIGN PATENT DOCUMENTS

| | | |
|---|---|---|
| 3420015A1 | 12/1985 | Germany . |
| 3633405A1 | 4/1988 | Germany . |
| 3824406C1 | 5/1989 | Germany . |
| 4229722A1 | 3/1994 | Germany . |
| 44 34 777 | 9/1994 | Germany . |
| 443477C1 | 9/1995 | Germany . |
| 4434776C2 | 1/1997 | Germany . |
| 355109726A | 8/1980 | Japan . |
| 358200031A | 11/1983 | Japan . |
| 359128919A | 7/1984 | Japan . |

*Primary Examiner*—Thomas Denion
*Assistant Examiner*—Thai-Ba Trieu
*Attorney, Agent, or Firm*—Robert W. Becker & Associates

[57] ABSTRACT

In a method for turbocharging an internal combustion engine multiple turbochargers are arranged in parallel for supplying turbocharged air to the cylinders of the internal combustion engine via a valve device controlling distribution of the turbocharged air to the cylinders. Each cylinder receives turbocharged air from only one turbo charger at a time and each turbo charger supplies one or more cylinders with turbocharged air. The turbochargers are activated and deactivated according to operational states of the engine. At least one cylinder is switched with the valve device from a supply of turbocharged air of one turbo charger to a supply of turbocharged air of another turbo charger when activating and deactivating the turbochargers.

7 Claims, 2 Drawing Sheets

METHOD FOR TURBOCHARGING AN INTERNAL COMBUSTION ENGINE

BACKGROUND OF THE INVENTION

The present invention concerns a method for turbocharging an internal combustion engine in which turbocharged air is guided by a valve device to a varying number of cylinders of the internal combustion engine, based on a sequence of operational states ranges of the internal combustion engine. The turbocharged air amount can be changed by activating and deactivating at least one auxiliary turbocharger which is arranged in parallel to a first main turbocharger at the exhaust side. The activation and deactivation of the auxiliary turbocharger is based on the sequence of operational states of the internal combustion engine.

By employing turbocharging, a small-sized internal combustion engine can be improved with regard to its output so that it matches the output of a substantially larger internal combustion engine. In the case of a preset nominal output, the engine can be substantially reduced in size when turbocharging is employed. When turbocharging internal combustion engines with turbochargers, there are conflicting objectives, because, on the one hand, turbocharging allows an increase of rated output, while, on the other hand, the geometric-mechanical compression must be reduced proportional to the desired rated output increase. The reduction of the geometric-mechanical compression, however, results in a more than proportional reduction of the output or torque of the turbocharged internal combustion engine in the lower rpm range which results from the very steep output curve of the turbochargers for their own operational rpm diagram. A dynamic compressor or turbocharger can provide an optimal flow only within a very small rpm range and can thus provide a high output only within this range. However, this is in contrary to the desired pull hyperbola that is desirable for internal combustion engines of ground transportation vehicles. By employing a plurality of such turbochargers, the rpm range of the internal combustion engine as well as the special volumetric working size of the turbo charger can be divided. The correspondingly timely staggered switching of the turbocharger, however, causes the charging system to be in the range of pumping and also leads to the collapse of the turbocharged air flow in the newly activated compressor, when, for example, the air of the second compressor, that is initially guided at low pressure via a release valve into the ambient air, is guided into the turbocharged air collector of the internal combustion engine that is under full pressure generated by the first compressor, i.e. the flow from a dynamic compressor with relatively great flow velocity and minimal pressure building capacity is guided into a piston machine with relatively small flow velocity and relatively high pressure building capacity.

The aforementioned method for turbocharging an internal combustion engine is disclosed in German patent 44 34 777 C1. A valve device that is switchable as a function of a sequence of operational states, of the internal combustion engine a valve device that is switchable is provided for directing the turbocharged air flow into varying numbers of cylinders of the internal combustion engine. The valve device is embodied as a turbocharged air collector with two or more separating air flaps is inserted therein. These separating flaps serve to divide the turbocharge air collector into two portions with different division ratios that depend on the operational states, whereby each one of the cylinders that is separated from the turbocharged air flow is supplied with exhaust gas via a portion of the turbocharged air collector not supplied with turbocharged air. The the exhaust gas is delivered by an exhaust manifold that is common to all cylinders. This arrangement provides an operational spectrum with harmonic transition for a turbocharged multi cylinder diesel engine primarily from cold start conditions at very low ambient temperature to full load conditions at high engine rpm and very high ambient air temperature. When employing a total of four separating flaps, the flap that limits the turbocharged air collector to the greatest extent is correlated with cold start conditions, while the following separating flap corresponds to the starting state of the warm engine, the subsequent separating flap is correlated with idling at an ambient air temperature below 20° C., and the separating flap which limits the turbocharged air collector to a minimal extent correlates with idling of the engine above 20° C. ambient temperature. Furthermore, a first auxiliary switchable turbo charger is correlated with full load operation at low rpm, a second auxiliary switchable turbo charger is correlated with full load operation at medium range rpm, and a third auxiliary switchable turbocharger is correlated with full load operation at high rpm. In this switching method, there is also the risk, as mentioned above, of pumping, i.e., return flow of turbocharged air, and collapse of the turbocharged air flow.

It is therefore an object of the present invention to lower for a turbocharged internal combustion engine, in combination with an output increase, the fuel consumption and pollutant emissions, to improve the acceleration behavior at low rpm, to provide a harmonic transition operational spectrum from very low rpm at partial load and full load to high rpm at partial load and full load, and to provide a problem-free, timely staggered activation and decativation of at least one further turbo charger without a pumping effect or collapse of the turbocharged air flow.

SUMMARY OF THE INVENTION

This object is inventively solved with a method of the aforementioned kind in that in each cylinder of the internal combustion engine is supplied respectively with turbocharged air by only one of the turbochargers and that upon activation and deactivation of the respectively next turbo charger the turbocharged air supply of at least one cylinder is switched from the turbocharged air flow of one turbo charger onto the turbocharged air flow of another turbo charger.

In the inventive method for turbocharging an internal combustion engine, the turbocharged air flows of the individual turbo, in contrast to the prior art, chargers are thus not combined in a turbocharged air collector but are kept separate from one another on their path to the inlet valve of the respective cylinders of the combustion engine. In this context, it should be noted that none of the cylinders of the internal combustion engine is excluded from the turbocharged air supply, for example, for the purpose of improved cold start operation. By separating the turbocharged air flows, the respectively newly generated turbocharged air pressure can be developed in the next i.e., newly activated turbo charger without disturbance by the already established turbocharged air pressure of the previously activated turbo charger already in operation. As a valve device for distributing the separate turbocharged air flows to the respective cylinders of the internal combustion engine, an electrically controllable turbocharged air register is provided. All of the turbocharged air flows will flow into a register container that is common to all of the cylinders, similar to a conventional turbocharged air collector, but, by providing displaceable pistons or pivotable flaps or other separating valves, one or more cylinders can be connected respectively to only one of the turbo charges. The advantages that result from the present invention lie especially in that the operational spectrum of the internal combustion engine can be divided with a harmonic transition. As a fine-timing means, after activating and before deactivating the next turbo charger for providing a further operational state of the internal combustion engine, the turbocharged air supply of at least one further cylinder is switched from the turbocharged air supply of a turbo charger to the turbocharged air flow of another turbo charger.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 and 2a–2i.

Figure 1:
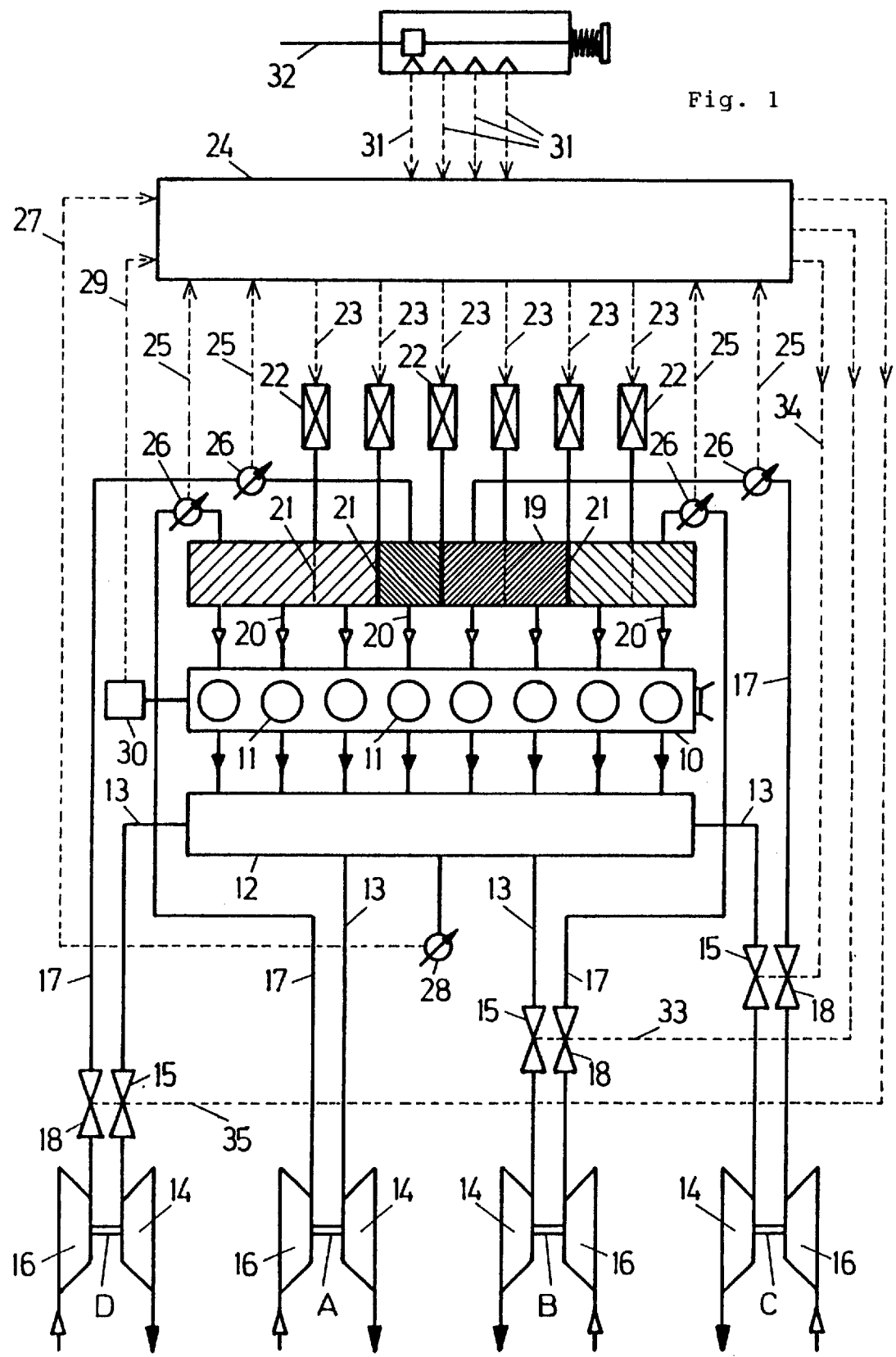
FIG. 1 shows a device for performing the inventive method, illustrating one particular method step.
Figure 2A:
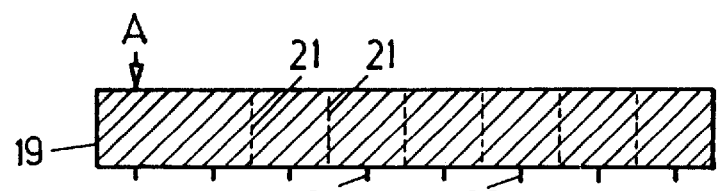
FIGS. 2a–2i show the entire spectrum of the method steps in relation to the inventive device in FIG. 1.
Figure 2B:
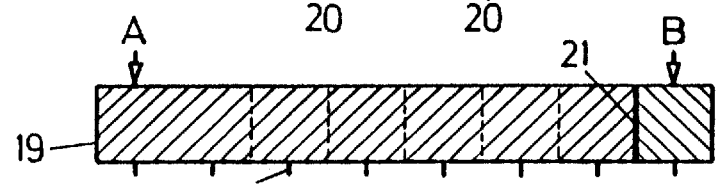
Figure 2C:
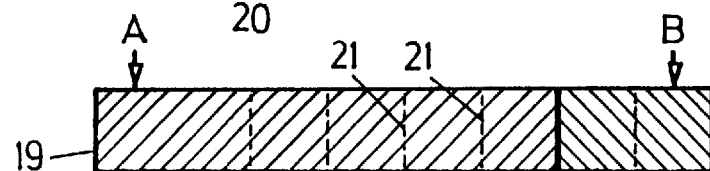
Figure 2D:
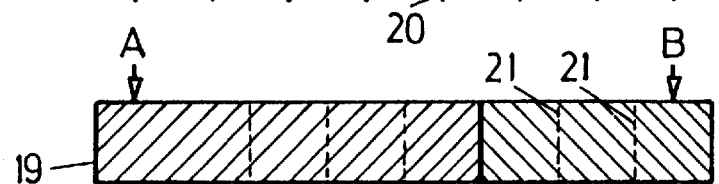
Figure 2E:
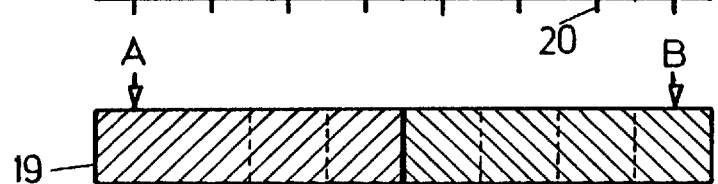
Figure 2F:
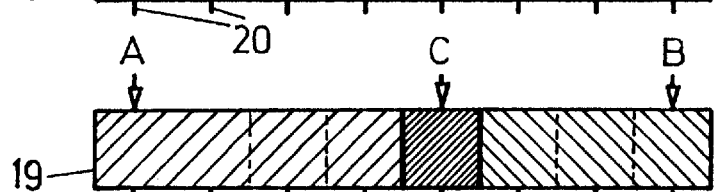
Figure 2G:
Figure 2H:
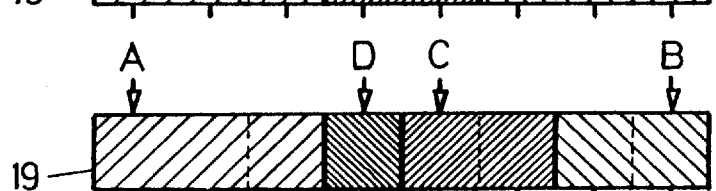
Figure 2I:
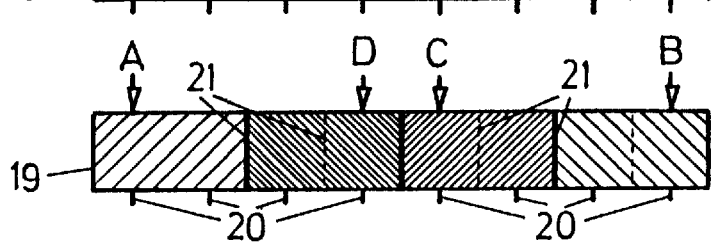

At the center of FIG. 1, an internal combustion engine 10 with eight cylinders 11 is shown whose exhaust gas is guided into an exhaust gas collector or manifold 12. A respective exhaust gas line 13 is guided via turbine 14 into one of the total of four exhaust gas turbochargers A, B, C, and D whereby in the case of exhaust gas turbochargers B, C, and D a switching valve 15, is provided in the line 13 while in the case of the turbo charger A no such switching valve 15 is provided. The respective compressor 16 of the four exhaust gas turbochargers A, B, C, and D is a component of a turbocharged air connection 17 which, in the case of turbochargers B, C, and D, comprises a switching valve 18 and in the case of turbo charger A has no such switching valve 18.

The valve device 19 for distributing, according to the operational ranges a through i according to FIGS. 2a–2i, the four turbocharged air flows produced by the exhaust gas turbochargers A, B, C, and D onto the eight cylinders 11 of the internal combustion engine 10 is embodied as an electrically controlled turbocharged air register. As in the case of a conventional turbocharged air collector, all of the turbocharged air flows enter a container which is common to all cylinders 11. However, by providing separating flaps 21, between the eight cylinder connectors 20 with one exception separate chambers for providing a separate guiding action of the different turbocharged air flows is realized. In FIGS. 2a–2i the individual chamber separations of all operational stages a through i of the internal combustion engine 10 are shown in a table-like arrangement whereby a closed separating flap 21 is shown by a solid line, while an open separating flap 21 is shown in dashed lines. The turbocharged air flows of the four turbochargers A, B, C, and D that are separate from one another are indicated by different cross hatching. The representation of the valve device 19 in the most complex operational state h of the internal combustion engine 10 has been taken from FIG. 2h and included in FIG. 1.

The actuating devices 22 of the six separating flaps 21 are connected by a respective control line 23 to a computer 24 which employs measured values for switching (controlling) the valve device 19 and the turbochargers B, C, and D, preferably indirectly by comparison with digitally stored switching profiles. Various measured values such as turbocharged air pressures, supplied by the turbochargers A, B, C, and D, or the exhaust gas pressure present within the gas manifold 12, the rpm of the internal combustion engine 10, or, for example, the gas pedal (accelerator) position which indicates the load requests, can be employed in any combination for this purpose. For illustrating these possibilities, in FIG. 1 a respective signal line 25 is guided to the computer 24 from each one of the four pressure gauges 26 mounted in the turbocharged air lines 17, a further signal line 27 from the pressure gauge 28 within the exhaust gas collector manifold 12, a signal line 29 connected to the shaft of the tachometer of the internal combustion engine, and a respective signal line 31 from each of the four travel sensors at the gas pedal (accelerator) 32 of the internal combustion engine. A further control line 33 is guided from the computer 24 to the two switching valves 15 and 18 of the turbo charger B, a control line 34 to the two switching valves 15 and 18 of the turbo charger C, and a control line 25 to the switching valves 15 and 18 of the turbo charger D.

The four turbochargers A, B, C, and D, having approximately the same size, are distributed uniformly and are switchable under full load depending on the operational rpm diagram of the internal combustion engine 10. Their singular operating parameter correspond, correlated with their total number, approximately to one fourth of the maximum exhaust gas and turbocharged air throughput of the internal combustion engine at full load and maximum rpm. The four turbochargers A, B, C, and D of approximately the same size therefore have their maximum output respectively at the operational rpm diagram points 25%, 50%, 75% and 100% of the maximum rpm at full load in order to provide for a use, respectively, best output efficiency of the first exhaust gas turbo charger A without switching valves 15 and 18 as early as possible and to furthermore provide a spacing between the maximum output points of the turbochargers A, B, C, and D and the zero point of substantially the same value.

In the initial position of the electrically controllable turbocharged air register, that embodies the valve device 19, and in the lowest operational state a of the internal combustion engine 10, all six separating flaps 21 are open so that all eight cylinders 11 will be supplied with turbocharged air by the exhaust gas turbo charger A. The first turbo charger A has no shut-off device at the exhaust gas side or the turbocharged air side and operates therefore from the start of the internal combustion engine 10 over the entire operational rpm range of the internal combustion engine 10. When at full load approximately a fourth of the rpm range has been reached, the sixth separating flap 21 separates, before the eighth cylinder 11, a chamber which in the operational state b of the internal combustion engine 10 is for the first time supplied with turbocharged air from the now activated exhaust gas turbo charger B. When this turbo charged air pressure reaches the pressure level of the exhaust gas turbo charger A, with a minimal safety limit, the fifth separating flap 21 is closed and the sixth separating flap 21 is opened again so that the exhaust gas turbo charger A, in the operational state C, of the internal combustion engine 10, only supplies the first six cylinders 11 with turbocharged air, while the exhaust gas turbo charger B now supplies the last two cylinders 11. Again, the turbocharged air pressure of the turbo charger B must reach approximately the pressure value of the turbo charger A in order to initiate a switching process whereby, for the operational state d of the internal combustion engine 10, the fourth separating flap 21 is closed and shortly thereafter the fifth separating flap 21 is opened again. This is repeated with the third and fourth separating flaps 21 so that subsequently in the operating state e of the internal combustion engine 10 four cylinders 11 are respectively supplied with turbocharged air by the turbochargers A and B.

In the operation state f of the internal combustion engine 10, the turbo charger C is activated for the first time whereby the third separating flap 21 remains closed and the fourth separating flap 21 is additionally closed in order to allow the turbo charger C to reach its highest operating level without disturbance. After the turbocharged air pressure level of the turbo charger A has been reached, again with a certain safety margin, the second separating flap 21 will be closed and the third separating flap 21 will be opened shortly thereafter, thus providing the operational state g of the internal combustion engine 10. When identical pressure has been reached again, the fifth separating flap 21 will be closed and the fourth separating flap 21 will be opened. When again identical pressure has been reached, the third separating flap 21 will open, and the first chamber for the turbo charger D in the area of the fourth cylinder 11 is now available for the operational state h of the internal combustion engine 10. After a signal for identical pressure has been received, the first separating flap 21 will open and the second separating flap 21 will close so that the operational state i of the internal combustion engine 10 is realized. Now all four turbochargers A, B, C, and D take part in the turbocharging process and only a drop of the leading pressure, coming from the exhaust gas turbo charger A, under a predetermined level will provide a signal for switching back from the operational state i down to the operational state a. Since reducing of the motor output is much faster and much easier, and must be much faster and easier, than output increase, substantially the direct path to the initial point, respectively, the starting phase is selected. This is realized in that, at the end of the high output demand, immediately and without intermediate steps all six separating flaps 21 are opened if they have not been opened individually beforehand.

A stepwise return from the highest operational state i or any other upper operational state of the internal combustion engine 10, is, in principle, carried out in the reverse order as the switching processes toward higher operational states. Based on the operational state i the second separating flap 21 is closed and then the first separating flap 21 opens. Then the turbo charger D is deactivated and the third separating flap 21 opened. Subsequently, the fourth operating flap is closed and the fifth separating flap 21 opened so that the operational state g is reached. Then the third separating flap 21 is closed and the second separating flap 21 opened. The exhaust gas turbo charger C is now switched off (deactivated). Subsequently, the fourth separating flap 21 is opened so that the operational state e is reached. Subsequently, when needed, the fourth separating flap 21 is closed and the third separating flap 21 is opened. Thereafter, the fifth separating flap 21 is closed and the fourth separating flap is opened. Subsequently, the sixth separating flap 21 is closed and the fifth separating flap 21 opened. Finally, the exhaust gas turbo charger B is switched off (deactivated) and the sixth separating flap 21 is opened.

FIG. 2 illustrates that after switching on (activating) and before switching off (deactivating) the next exhaust gas turbo charger B, respectively, C, respectively, D for realizing a further operational state d or e respectively, g or i of the internal combustion engine 10, the turbocharged air supply of a further cylinder 11 is switched from the turbocharged air flow of one turbo charger to the turbocharged air flow of another turbo charger. Whether this is performed simultaneously for more than one cylinder, is a question of the number of cylinders of the internal combustion engine 10 and, for example, also a question of differentiating between the output increase and output decrease of the internal combustion engine 10. In any case, with the disclosed measure a much improved fine tuned division of the operational spectrum of the internal combustion engine 10 into a greater number of operational states result without interference of the separately guided turbocharged air flows.

An especially advantageous division of the operating spectrum of the internal combustion engine 10 lies in that the operational stage f resulting from activating the third exhaust gas turbo charger C follows the operational state e with an equal division of the eight cylinders 11 onto the first exhaust gas turbo charger A and the second exhaust gas turbo charger B. This provides a fine adjustment in operational states where the combustion engine 10 is operated most of the time and the higher ranging exhaust gas turbochargers C and D are not yet required. The turbocharged air demand on the two exhaust gas turbochargers A and B in the operational state e of the internal combustion engine 10 favors the use of constructively identical types that have substantially the same output. This holds true, in particular, also in the highest operational state i of the internal combustion engine 10 where each one of the turbochargers A, B, C, and D respectively supplies the same number of cylinders 11 with turbocharged air. Accordingly, it is desirable to always have an integer ratio of the number of cylinders 11 of the internal combustion engine 10 to the number of provided turbochargers.

In order to further improve a harmonic transitional division of the operational spectrum of the internal combustion engine, the rpm range of the internal combustion engine 10 at full load is substantially uniformly divided by the respective positions of the valve device 19 according to the total number of exhaust gas turbochargers and, by intermediate positions of the valve device 19, a substantially uniform subdivision of these rpm ranges is provided. Advantageously, the sequence of different positions of the valve device 19, arranged upstream of the cylinders 11 of the internal combustion engine 10, is correlated to the sequence of operational stages a through i of the internal combustion engine 10 and controlled by the measured value combinations of the pressure gauges 26 of the turbochargers A, B, C, and D and the pressure gauge 28 common to all cylinders 11. This is advantageous because, when doing so, the measured values are narrowly correlated to the control result and because a simple pressure gauge can be used as a measuring device. However, it is possible to use, as an alternative or in combination, for the same purpose measured values of the tachometer 30 connected to the shaft of the internal combustion engine 10 and of the load demands from the gas pedal (accelerator) 32 of the internal combustion engine 10.

The specification incorporates by reference the disclosure of German priority document 198 23 014.1 of May 22, 1998.

The present invention is, of course, in no way restricted to the specific disclosure of the specification and drawings, but also encompasses any modifications within the scope of the appended claims.

What is claimed is:

1. A method for turbocharging an internal combustion engine, said method comprising the steps of:

a) arranging multiple turbochargers (A, B, C, D) in parallel for supplying turbocharged air to the cylinders

(11) of the internal combustion engine (10) via a valve device (19) controlling distribution of the turbocharged air to the cylinders (11), wherein each cylinder (11) receives turbocharged air from only one turbocharger (A, B, C, D) at a time and wherein each turbocharger (A, B, C, D) supplies one or more cylinders (11) with turbocharged air;

b) activating and deactivating the turbochargers (A, B, C, D) according to operational states of the engine;

c) switching with the valve device (19) at least one cylinder from a supply of turbocharged air of one turbocharger (A, B, C, D) to a supply of turbocharged air of another turbocharger (A, B, C, D) when activating and deactivating the turbochargers (A, B, C, D).

2. A method according to claim 1, wherein in said step c) for realizing a further operational state of the engine (c, d, e, g, i), after activating and before deactivating the turbochargers (B, C, D) according to step b), at least one further cylinder, in addition to said at least one cylinder, is switched from a supply of turbocharged air of one turbocharger to a supply of turbocharged air of another turbocharger.

3. A method according to claim 2, wherein in said step b) a third turbocharger (C) is activated for a further operational state (f) of the engine, wherein said further operational state (f) of the engine follows an operational state (e) of the engine in which one half of the number of cylinders is supplied with turbocharged air by a first turbocharger and the other half of the number of cylinders is supplied with turbocharged air by a second turbocharger.

4. A method according to claim 2, wherein in a highest operational state (i) of the engine each one of the turbochargers (A, B, C, D) supplies the same number of cylinders with turbocharged air.

5. A method according to claim 2, wherein an rpm range of the engine at full load is divided into substantially identical portions by respective positions of the valve device (19) according to the total number of turbochargers (A, B, C, D) and wherein intermediate positions of the valve device (19) provide a further substantially identical subdivision of the identical portions of the rpm range.

6. A method according to claim 1, further comprising the step of controlling the positions of the valve device (19), correlated with the operational states (a–i) of the engine, based on pressure values measured by turbocharged air pressure gauges of the turbochargers and an exhaust gas pressure gauge of the engine.

7. A method according to claim 6, further comprising the step of comparing the measured pressure values to a switching profile stored in a computer (24) and controlling said steps b) and c) based on the comparison data.

* * * * *